United States Patent
Ishizu et al.

(10) Patent No.: US 8,367,243 B2
(45) Date of Patent: Feb. 5, 2013

(54) LITHIUM SECONDARY BATTERY

(75) Inventors: Takenori Ishizu, Hitachinaka (JP); Toru Kojima, Fukaya (JP)

(73) Assignee: Hitachi Vehicle Energy, Ltd., Ibaraki (JP)

(*) Notice: Subject to any disclaimer, the term of this patent is extended or adjusted under 35 U.S.C. 154(b) by 500 days.

(21) Appl. No.: 12/357,518

(22) Filed: Jan. 22, 2009

(65) Prior Publication Data

US 2009/0186278 A1 Jul. 23, 2009

(30) Foreign Application Priority Data

Jan. 22, 2008 (JP) ................ 2008-011142

(51) Int. Cl.
H01M 4/13 (2010.01)
(52) U.S. Cl. ........................................ 429/209
(58) Field of Classification Search ......... 429/121–347; 29/623.1–623.5
See application file for complete search history.

(56) References Cited

U.S. PATENT DOCUMENTS

| 6,335,114 B1 * | 1/2002 | Ueshima et al. ............... 429/94 |
| 6,432,574 B1 | 8/2002 | Suzuki et al. |
| 2002/0102460 A1 * | 8/2002 | Nakai et al. ................ 429/224 |
| 2003/0190530 A1 * | 10/2003 | Yang et al. ................ 429/326 |
| 2004/0115523 A1 * | 6/2004 | Hommura et al. ........... 429/144 |
| 2007/0048613 A1 | 3/2007 | Yanagida et al. |
| 2007/0048615 A1 | 3/2007 | Nagayama et al. |

FOREIGN PATENT DOCUMENTS

| JP | 11-185736 | 7/1999 |
| JP | 2000-251942 | 9/2000 |
| JP | 2005-268139 | 9/2005 |

OTHER PUBLICATIONS

Yamada, Kazuhiro. JP2005-268139. Sep. 29, 2005. English Machine translation provided by JPO.*
EP Search Report of Application No. 09000830.1 dated May 11, 2009.
JP Office Action of Appln. 2008-011142 dated May 15, 2012 with partial English translation.

* cited by examiner

*Primary Examiner* — Jennifer McNeil
*Assistant Examiner* — James Lee
(74) *Attorney, Agent, or Firm* — Antonelli, Terry, Stout & Kraus, LLP.

(57) ABSTRACT

In a lithium secondary battery, the electrode assembly includes a positive electrode and a negative electrode which are assembled together with a separator interposing between said both electrodes. Each of the electrodes includes an active material mixture layer portion and an active material mixture layer free-portion which are arranged on a surface of said metal foil. A relationship of B1<B2 is satisfied, and a value of (A1+A2)/(B2−B1) is set equal to or less than 4. Where B1 (mm) is a width of the active material mixture layer portion of the positive electrode; B2 (mm) is a width of the active material mixture layer portion of the negative electrode; and each of A1 (mm) in the positive electrode and A2 (mm) in the negative electrode is a deviation between a straight line linking both corners of the active material mixture layer-free portion in the length direction of the metal foil and an edge of the active material mixture layer-free portion at a middle point in the length direction of the metal foil.

5 Claims, 2 Drawing Sheets

LITHIUM SECONDARY BATTERY

CLAIM OF PRIORITY

This application claims priority from Japanese patent application serial no. 2008-011142, filed on Jan. 22, 2008, the content of which is hereby incorporated by reference into this application.

FIELD OF THE INVENTION

The present invention relates to lithium secondary batteries, and more particularly, to a lithium secondary battery for accommodating an electrode assembly including a positive electrode and a negative electrode assembled together with a separator in a battery case. Each electrode includes a portion having an active material mixture layer and a portion not having the active material mixture layer.

BACKGROUND OF THE INVENTION

Conventionally, aqueous solution batteries, such as a lead battery, a nickel-cadmium battery, or a nickel-hydrogen battery, have become mainstream in the field of a rechargeable secondary battery. Recently, lithium secondary batteries having a high energy density have attracted increasing attention with reduction in size and weight of electric devices, and thus have been studied, developed, and commercialized rapidly. At present, small-sized consumer-oriented lithium secondary batteries are widely used for a cellular phone and a laptop computer.

On the other hand, electric vehicles (EV) and hybrid electric vehicles (HEV) designed to assist part of driving power using an electric motor have been developed by various automakers from the viewpoint of problems, including global warning and fuel depletion. Thus, a secondary battery with high output power and capacity is required as a power source for such vehicles. Nonaqueous solution lithium secondary batteries having a high voltage have received attention as the power source for satisfying such a requirement.

However, even the lithium secondary battery having a high voltage is required to achieve large current charge and discharge in addition to the high voltage, for example, because the motor for driving the HEV has high output. Thus, each electrode of the battery for the HEV includes a portion not having an active material mixture layer, namely an active material mixture layer-free portion to be apart of a current collector in addition to an active material mixture layer. The active material mixture layer portion and the active material mixture layer-free portion are arranged on a surface of metal foil in a width direction of metal foil corresponding to an axial direction of an assembly and extended in a length direction of the metal foil lying at right angles to the width direction. The active material mixture layer free-portion is arranged at one end side in the width direction to be a part of collector so as to enable the large current charge and discharge. The active material mixture layer free-portion is used as a lead to be directly or indirectly connected to an external current collector terminal, thereby improving a current collecting efficiency (see, for example, JP-A-2005-268139).

However, in the electrode including the active material mixture layer portion and the active material mixture layer free-portion, a metal foil (collector foil) portion where the active material mixture layer portion is positioned is although rolled by press working for adjusting a density of the active material mixture layer, a metal foil (collector foil) portion where the active material mixture layer-free portion is positioned is not rolled. As a result, a shape of the electrodes become distorted, which may cause positions where the positive electrode mixture layer and the negative electrode mixture layer are not opposed to each other via the separator due to the degree of distortions of the electrodes in manufacturing the electrode assembly. The positions where the mixture layers of both electrodes are not opposed to each other are difficult to be subjected to the charge and discharge reaction. The existence of such positions of the mixture layers not subjected to the reaction may disadvantageously apply the excessive charge and discharge reaction to other remaining positions of the mixture layers opposed to each other, which leads to reduction in capacity and lifetime of the battery due to degradation of active material. Further, the nonuniform reaction may generate lithium dendrite to cause internal short circuit.

The present invention is to solve such problems and to provide a lithium secondary battery which enables to charge and discharge for large current with excellent charge and discharge characteristics and safety.

SUMMARY OF THE INVENTION

In order to solve the foregoing problems, the invention provides a lithium secondary battery having the following arrangement.

The lithium secondary battery is comprised of:

an electrode assembly accommodated in a battery case;

the electrode assembly including a positive electrode and a negative electrode which are assembled together with a separator interposing between the both electrodes;

each of the electrodes including an active material mixture layer portion and an active material mixture layer free-portion which are arranged on a surface of the metal foil in a width direction of the metal foil corresponding to an axial direction of the electrode assembly and extended in a length direction of the metal foil lying at right angles to the width direction; and the active material mixture layer free-portion arranged at one end side in the width direction to be a part of collector.

Furthermore, the lithium secondary battery is characterized in that a relationship of $B1<B2$ is satisfied, and a value of $(A1+A2)/(B2-B1)$ is set equal to or less than 4. Where $B1$ (mm) is a width of said active material mixture layer portion of said positive electrode; $B2$ (mm) is a width of said active material mixture layer portion of said negative electrode; and each of $A1$ (mm) in said positive electrode and $A2$ (mm) in said negative electrode is a deviation between a straight line linking both corners of said active material mixture layer-free portion in said length direction of said metal foil in the corresponding electrode having been extended by a predetermined load and an edge of said active material mixture layer-free portion at a middle point in said length direction of said metal foil.

In the invention, preferably, the active material mixture layer of the positive electrode contains lithium transition metal double oxide, and the active material mixture layer portion of the negative electrode contains carbon material. The electrode may be extended in its length direction by being subjected to the predetermined load before assembling. Further, the battery preferably has a capacity of 3 Ah or more, and a maximum discharge current value of 60 A or more.

According to the invention, since the above-mentioned relation $B1<B2$ is satisfied, and a value of $(A1+A2)/(B2-B1)$ is set equal to or less than 4, the battery enables to charge and discharge for large current with excellent charge and discharge characteristics and safety.

DETAILED DESCRIPTION OF THE PREFERRED EMBODIMENTS

Figure 1:
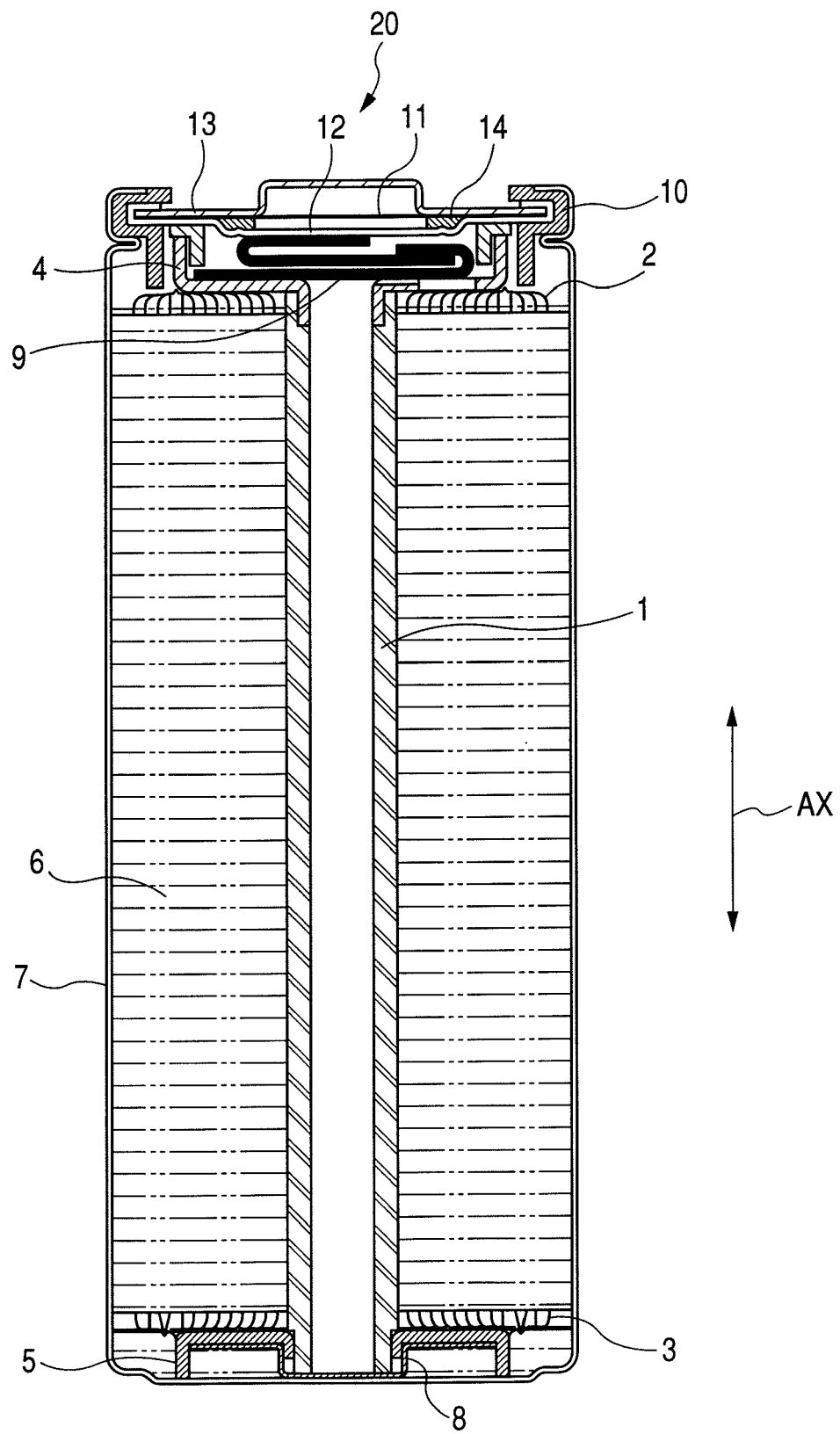
FIG. 1 is a sectional view of a lithium ion battery according to one embodiment of the invention.

Now, one embodiment in which the invention is applied to a cylindrical lithium secondary battery for the HVE will be described below with reference to the accompanying drawings.
(Positive Electrode)

In processes of manufacturing a positive electrode, Lithium-including double oxide powder as a positive-electrode active material, scaly graphite as a conductive material, and polyvinylidene fluoride (PVDF) as a binder are mixed at a ratio by weight of 85:10:5. Then, the mixture is kneaded with N-methylpyrrolidone (NMP) as dispersing solvent, thereby slurry is formed. The slurry is applied to both sides of aluminum foil having a thickness of 20 µm except for an area to form positive electrode lead pieces and the vicinity of them. Then, the aluminum foil with the slurry is dried, pressed, and cut to obtain a positive electrode. As shown in FIG. 2A, the positive electrode formed by the above-mentioned processes is comprised of an active material mixture layer portion 201 and an active material mixture layer-free portion 202, which are arranged on a surface of the alminum foil 100 in a width direction (W) of the alminum foil 100 corresponding to an axial direction (AX: refer to FIG. 1) of the electrode assembly 6 and extended in a length direction (L) of the aluminum foil 100 lying at right angles to the width direction (W). The active material mixture layer free-portion 202 is arranged at one end side in the width direction (W) to be a part of collector. The active material mixture layer-free portion 202 is provided with positive electrode lead pieces 2 which are formed in like teeth of comb having each tooth width of several millimeters by cutting. Incidentally, the active material mixture layer-free portion 202 originally takes on a strip shape extending lengthwise as with the active material mixture layer portion 201 before forming the lead pieces 2 by cutting. In the above-mentioned process, the positive electrode P is pressed with a predetermined load (for example, with "1 N" in this embodiment) so as to be extended in the length direction (L) of the electrode (in other words, the length direction of the aluminum foil before being rolled up). Thereby, the positive electrode P has the followings: a width (hereinafter the width is referred as a "positive-electrode active material mixture layer-width B1") of 80 to 84 mm as to the active material mixture layer portion 201; a distance of 2 to 26 mm (hereinafter referred to as a "deviation A1") between a straight line linking both corners of the active material mixture layer-free portion 202 in the length direction of the electrode and an edge of the active material mixture layer-free portion 202 at a middle point in the length direction of the electrode; a thickness of 90 to 150 µm; and a length of 3.8 to 4.2 m.

(Negative Electrode)

In processes of manufacturing a negative electrode, 90 parts by weight of amorphous carbon powder as a negative-electrode active material and 10 parts by weight of PVDF as a binder were kneaded with NMP as a dispersing solvent, thereby slurry was formed. The slurry is applied to both sides of rolled copper foil 101 having a thickness of 10 µm except for an area to form positive electrode lead pieces and the vicinity of them. Then, the copper foil 101 with the slurry is dried, pressed, and cut to a negative electrode. As shown in FIG. 2B, the negative electrode formed by the above-mentioned processes is comprised of an active material mixture layer portion 301 and an active material mixture layer-free portion 302, which are arranged on a surface of the rolled copper foil 101 in a width direction (W) of the rolled copper foil 101 corresponding to the axial direction (AX: refer to FIG. 1) of the electrode assembly 6 and extended in a length direction (L) of the rolled copper foil 101 lying at right angles to the width direction (W). The active material mixture layer free-portion 302 is arranged at one end side in the width direction (W) to be a part of collector. The active material mixture layer-free portion 302 is provided with negative electrode lead pieces 3 which are formed in like teeth of comb having each tooth width of several millimeters by cutting. Incidentally, the active material mixture layer-free portion 302 originally takes on a strip shape extending lengthwise as with the active material mixture layer portion 301 before forming the lead pieces 3 by cutting. In the above-mentioned process, the negative electrode N is pressed with a predetermined load (for example, with "1 N" in this embodiment) so as to be extended in the length direction (L) of the electrode (in other words, the length direction of the rolled copper foil). Thereby, the negative electrode N has the followings: a width (hereinafter the width is referred as a "negative-electrode active material mixture layer width B2") of 84 to 88 mm as to the strip portion 301 of the active material mixture layer; a distance of 2 to 4 mm (hereinafter referred to as a "deviation A2") between a straight line linking both corners of the active material mixture layer-free portion 302 in the length direction of the electrode and an edge of the active material mixture layer-free portion 302 at a middle point in the length direction of the electrode; a thickness of 90 to 150 µm; and a length of 4.0 to 4.4 m.

(Manufacturing of Battery)

Figure 2A:
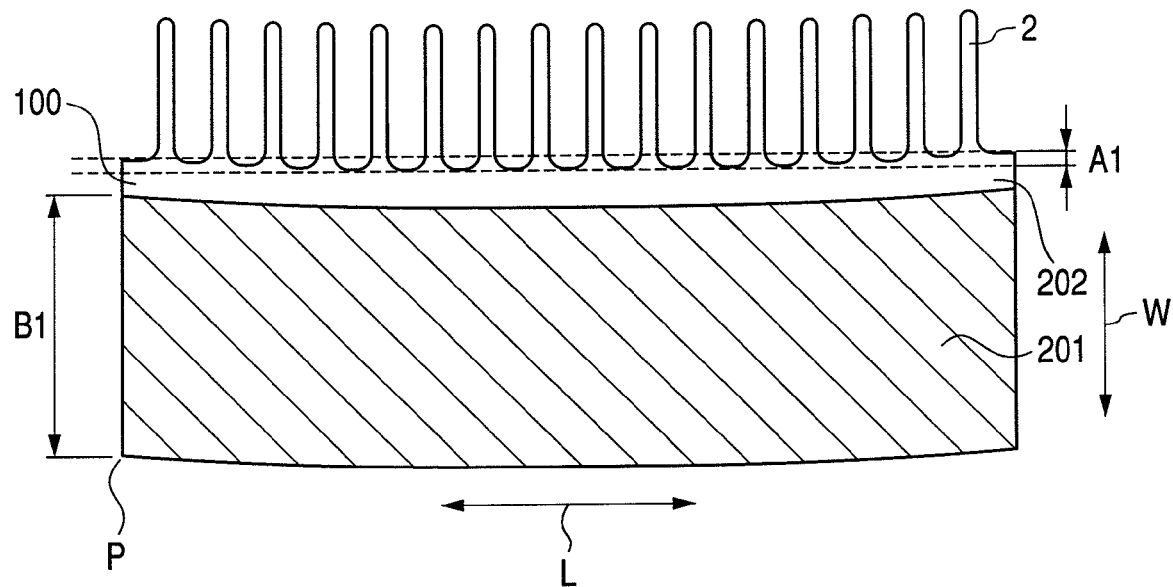
FIG. 2A is a plan view schematically showing a positive electrode of the lithium ion battery before being rolled up in the embodiment.
Figure 2B:
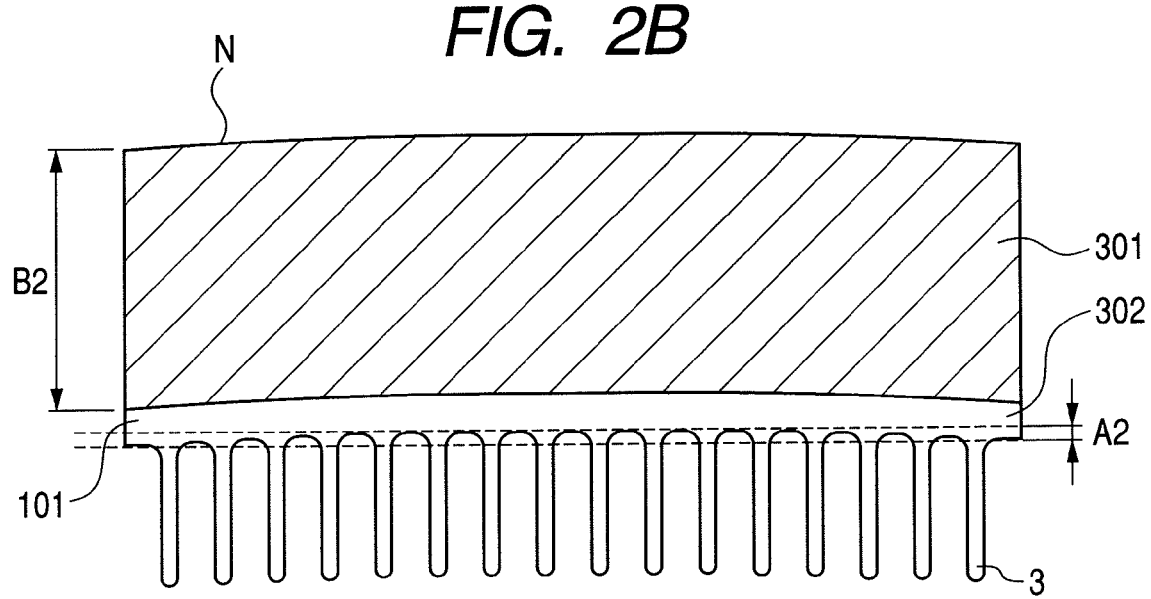
FIG. 2B is a plan view schematically showing a negative electrode of the lithium ion battery before being rolled up in the embodiment.

As shown in FIG. 1, the positive electrode and the negative electrode manufactured as mentioned above are rolled up together with a porous polyethylene separator (not illustrated) having a width of 92 mm and a thickness of 40 µm such that the separator is interposed between the electrodes not to bring both electrodes into direct contact with each other, thereby to form a rolled-up electrode assembly 6 serving as a set of electrodes. In rolling up them, the positive electrode, the negative electrode, and the separator are extended under a load of 10 N in the electrode length direction and in the separator longitudinal direction, while being rolled up and controlled along with meandering such that the ends of the electrodes and the ends of the separator in the width direction of the electrode (namely in the axial direction of the electrode assembly 6) are located in predetermined positions. A hollow cylindrical bobbin 1 made of polypropylene is disposed at a center of the rolled-up electrode assembly 6. At this time, the positive electrode lead pieces 2 and the negative electrode lead pieces 3 are positioned at both ends of the rolled-up electrode assembly 6 being opposed to each other.

The positive electrode lead pieces 2 are bent to be collected and brought into contact with each other around a surface of a flange integrally formed with a positive electrode current collector ring 4, and then connected to the surface of the flange by ultrasonic welding. On the other hand, connection of the negative electrode lead pieces 3 to a negative electrode current collector ring 5 is performed in the same way as that of the positive electrode lead pieces 2 to the positive electrode current collector ring 4. Thereafter, the entire surface of the flange of the current collector ring 4 was coated with an insulating coating, and the rolled-up electrode assembly 6 was inserted into a battery case 7 of steel coated with nickel plating.

The negative electrode current collector ring 5 is previously welded to a negative electrode lead plate 8 for electric conduction. The negative electrode lead plate 8 is connected to the bottom of the case 7 by welding after the rolled-up electrode assembly 6 was inserted into the battery case 7.

On the other hand, a positive electrode lead 9, which is formed by previously laminating a plurality of ribbons made of aluminum, is connected to the positive electrode current collector ring 4 by welding, and the other end of the positive electrode lead 9 is connected to the lower surface of a battery lid for closing the battery case 7 by welding. The battery lid includes a lid case 12, a lid cap 13, a valve holding member 14 for keeping sealing, and a safety valve 11. The battery lid is assembled by depositing these elements and crimping the peripheral edge of the lid case 12.

Then, a nonaqueous electrolyte solution is charged into the battery case 7 in a predetermined amount to immerse the rolled-up electrode assembly 6 thereinto. The battery case 7 is closed with the lid in such a manner to enable folding of the positive electrode lead 9, and the battery lid is crimped and fixed to the case 7 via a gasket 10 made of EPDM resin to be sealed, thereby completing the manufacturing of a cylindrical lithium ion battery 20 (see FIG. 1). The nonaqueous electrolyte solution in use is one obtained by mixing ethylene carbonate and dimethyl carbonate at a volume ratio of 1:2, and lithium hexafluorophosphate ($LiPF_6$) in use is dissolved into the liquid mixture described above at a concentration of 1 mol/liter.

As mentioned above, in the lithium ion battery 20 of this embodiment, each of the positive and negative electrodes is provided with the active material mixture layer portion (201, 301) and the active material mixture layer free-portion (202, 302) which are arranged on the surface of the metal foil and extended along the length direction of the metal foil. The rolled-up electrode assembly 6 is manufactured by rolling up the positive and negative electrodes interposing the separator therebetween. The rolled-up electrode assembly 6 is immersed in the electrolyte solution and accommodated in the battery case 7. In the lithium ion battery 20 of this embodiment, the negative-electrode active material mixture layer width B2 is set larger than the positive-electrode active material mixture layer width B1 (that is, B1<B2), and that (deviation A1+deviation A2)/(negative electrode active material mixture layer width B2−positive electrode active material mixture layer width B2) is equal to or less than 4 (that is, (A1+A2)/(B2−B1)≦4).

The lithium secondary battery generally uses lithium transition metal double oxide as the positive-electrode active material, and carbon material as the negative-electrode active material, like the lithium ion battery 20. Lithium contained in the positive-electrode active material is ionized by the charge to move to the electrolyte solution, while lithium ions contained in the electrolyte solution are captured into the carbon material at the negative electrode.

In order to ensure such a reaction, in the lithium secondary battery, the amount of lithium captured by the negative-electrode active material is larger than that of lithium discharged from the positive-electrode active material, and the supply of the lithium from the positive-electrode active material is controlled not to be excessive with respect to the amount of reacted lithium of the negative-electrode active material. Further, the negative-electrode mixture layer is disposed at a surface opposed to the positive-electrode mixture layer. The reason is as follows. If the amount of supply of the lithium from the positive electrode is excessive, or if the amount of supply of the lithium being unevenly distributed due to the positive-electrode mixture layer not being opposed to the negative-electrode mixture layer, lithium dendrite may be locally produced at the surface of the negative electrode. Accordingly, the lithium dendrite may penetrate the separator for preventing short circuit between the positive and negative electrodes, thereby causing internal short circuit. Such problems is solved by the above-mentioned arrangement as to the control of the lithium supply amount and the positive-electrode mixture layer to the negative-electrode mixture layer.

Incidentally, in general, each electrode of the battery for large current discharge (for example, a battery for the HEV including a capacity of 3 Ah or more) have the active material mixture layer-free portion, which is continuously formed at one side of the electrode along the length direction of a current collector-surface area of the metal foil (current collector foil), so as to enable the large current discharge. As mentioned above, in such electrodes, each metal foil although was rolled at a strip portion having the active material mixture layer portions (201 or 301) by press working for adjusting the density of the active material mixture layer, the metal foil has an area not been rolled by press working, namely the area of the active material mixture layer free-portion. As a result, a shape of the electrodes become distorted, which may cause positions where the positive electrode mixture layer and the negative electrode mixture layer are not opposed to each other via the separator due to the degree of distortions of the electrodes in manufacturing the electrode assembly.

However, in the lithium ion battery 20 of this embodiment, the negative-electrode active material mixture layer width B2 is set larger than the positive-electrode active mixture layer width B1 (that is, B1<B2), and (deviation A1+deviation A2)/(negative-electrode active material mixture layer width B2−positive-electrode active material mixture layer width B2) is set equal to or less than 4 (that is, (A1+A2)/(B2−B1)≦4). According to such an arrangement, since electrodes can have permissible distortion capable of opposing the positive electrode mixture layer and the negative electrode mixture layer to each other effectively, the lithium ion battery 20 enables the large current charge and discharge (serving as an inherent function of the battery for the HEV), and can have both excellent charge and discharge characteristics and high safety without generating lithium dendrite.

In this embodiment, the lithium battery has electrodes with the active material mixture layer-free portions (202, 302) which have positive electrode lead pieces and negative electrode lead pieces like teeth of comb by cutting, respectively, but the invention is not limited to such active material mixture layer-free portions, for example, the lithium battery may have electrodes with the active material mixture layer-free portions with cutting-free electrode lead.

Incidentally, in this embodiment, the cylindrical lithium secondary battery is embodied, the battery of the invention is not limited to the columnar or cylindrical shape, and thus may be applied to a square battery.

Further, in this embodiment, the binder is PVDF, but the invention is not limited thereto. The binders may include polymer, such as polytetrafluoroethylene (PTFE), polyethylene, polystyrene, polybutadiene, butyl rubber, nitrile rubber, styrene/butadiene rubber, polysulfide rubber, cellulose nitrate, cyanoethyl cellulose, various kinds of latex, acrylic nitrile, vinyl fluoride, vinylidene fluoride, propylene fluoride, and chloroprene fluoride, and a mixture thereof.

Further, this embodiment although uses the nonaqueous electrolyte solution prepared by dissolving $LiPF_6$ in a liquid mixture of EC, DEC, and DMC, a general lithium salt may be used as an electrolyte, and a nonaqueous electrolyte solution formed by dissolving the salt in organic solvent may be used. That is, the invention is not limited to specific lithium salts and organic solvents. For example, electrolytes in use can be $LiClO_4$, $LiAsF_6$, $LiBF_4$, $LiB(C_6H_5)_4$, $CH_3SO_3Li$, $CF_3SO_3Li$, and a mixture thereof. The organic solvents may be in use, for example, propylene carbonate, ethylene carbonate, 1,2-dimethoxyethane, 1,2-diethoxyethan, γ-butyrolactone, tetraphydrofuran, 1,3-dioxolan, 4-methyl-1,3-dioxolan, diethyl ether, sulfolane, methylsulolane, acetonitrile, propionitrile, or a mixed refrigerant containing two or more of the above-mentioned solvents. The mixing ratio thereof is not limited to a specific one.

EXAMPLES

Now, examples of the cylindrical lithium ion battery 20 manufactured according to the above-mentioned embodiments will be described below. Comparison examples of batteries manufactured for comparison will also be described below.

Example 1

As shown in the following table 1, a battery of Example 1 in use included a positive electrode having a positive-electrode active material mixture layer width B1 of 80 mm (B1=80 mm), and a deviation A1 of 2 mm (A1=2 mm), and a negative electrode having a negative-electrode active material mixture layer width B2 of 85 mm (B2=85 mm), and a deviation A2 of 2 mm (A2=2 mm). A designed battery capacity was 5.6 Ah.

TABLE 1

| Item | Positive-electrode active material mixture layer width B1 (mm) | Negative-electrode active material mixture layer width B2 (mm) | A1 (mm) | A2 (mm) |
|---|---|---|---|---|
| Example 1 | 80 | 85 | 2 | 2 |
| Example 2 | 80 | 85 | 6 | 2 |
| Example 3 | 80 | 85 | 10 | 2 |
| Example 4 | 80 | 85 | 14 | 2 |
| Example 5 | 80 | 85 | 18 | 2 |
| Example 6 | 80 | 84 | 2 | 2 |
| Example 7 | 80 | 84 | 6 | 2 |
| Example 8 | 80 | 84 | 10 | 2 |
| Example 9 | 80 | 84 | 14 | 2 |
| Example 10 | 80 | 84 | 2 | 4 |
| Example 11 | 80 | 84 | 6 | 4 |
| Example 12 | 80 | 84 | 10 | 4 |
| Example 13 | 84 | 88 | 2 | 2 |
| Example 14 | 84 | 88 | 6 | 2 |
| Example 15 | 84 | 88 | 10 | 2 |
| Example 16 | 84 | 88 | 14 | 2 |
| Comparative Example 1 | 80 | 85 | 22 | 2 |
| Comparative Example 2 | 80 | 85 | 26 | 2 |
| Comparative Example 3 | 80 | 84 | 18 | 2 |
| Comparative Example 4 | 80 | 84 | 22 | 2 |
| Comparative Example 5 | 80 | 84 | 14 | 4 |
| Comparative Example 6 | 80 | 84 | 18 | 4 |
| Comparative Example 7 | 84 | 88 | 18 | 2 |
| Comparative Example 8 | 84 | 88 | 22 | 2 |

Example 2

As shown in Table 1, a battery of Example 2 was manufactured in the same way as that of Example 1 except that the battery of Example 2 in use included a positive electrode having a positive-electrode active material mixture layer width B1 of 80 mm (B1=80 mm), and a deviation A1 of 6 mm (A1=6 mm), and a negative electrode having a negative-electrode active material mixture layer width B2 of 85 mm (B2=85 mm), and a deviation A2 of 2 mm (A2=2 mm). (Designed battery capacity 5.6 Ah)

Example 3

As shown in Table 1, a battery of Example 3 was manufactured in the same way as that of Example 1 except that the battery of Example 3 in use included a positive electrode having a positive-electrode active material mixture layer width B1 of 80 mm (B1=80 mm), and a deviation A1 of 10 mm (A1=10 mm), and a negative electrode having a negative-electrode active material mixture layer width B2 of 85 mm (B2=85 mm), and a deviation A2 of 2 mm (A2=2 mm). (Designed battery capacity 5.6 Ah)

Example 4

As shown in Table 1, a battery of Example 4 was manufactured in the same way as that of Example 1 except that the battery of Example 4 in use included a positive electrode having a positive-electrode active material mixture layer width B1 of 80 mm (B1=80 mm), and a deviation A1 of 14 mm (A1=14 mm), and a negative electrode having a negative-electrode active material mixture layer width B2 of 85 mm (B2=85 mm), and a deviation A2 of 2 mm (A2=2 mm). (Designed battery capacity 5.6 Ah)

Example 5

As shown in Table 1, a battery of Example 5 was manufactured in the same way as that of Example 1 except that the battery of Example 5 in use included a positive electrode having a positive-electrode active material mixture layer width B1 of 80 mm (B1=80 mm), and a deviation A1 of 18 mm (A1=18 mm), and a negative electrode having a negative-electrode active material mixture layer width B2 of 85 mm (B2=85 mm), and a deviation A2 of 2 mm (A2=2 mm). (Designed battery capacity 5.6 Ah)

Example 6

As shown in Table 1, a battery of Example 6 was manufactured in the same way as that of Example 1 except that the battery of Example 6 in use included a positive electrode having a positive-electrode active material mixture layer width B1 of 80 mm (B1=80 mm), and a deviation A1 of 2 mm (A1=2 mm), and a negative electrode having a negative-electrode active material mixture layer width B2 of 84 mm (B2=84 mm), and a deviation A2 of 2 mm (A2=2 mm). (Designed battery capacity 5.6 Ah)

Example 7

As shown in Table 1, a battery of Example 7 was manufactured in the same way as that of Example 1 except that the battery of Example 7 in use included a positive electrode having a positive-electrode active material mixture layer width B1 of 80 mm (B1=80 mm), and a deviation A1 of 6 mm (A1=6 mm), and a negative electrode having a negative-electrode active material mixture layer width B2 of 84 mm (B2=84 mm), and a deviation A2 of 2 mm (A2=2 mm). (Designed battery capacity 5.6 Ah)

Example 8

As shown in Table 1, a battery of Example 8 was manufactured in the same way as that of Example 1 except that the battery of Example 8 in use included a positive electrode having a positive-electrode active material mixture layer width B1 of 80 mm (B1=80 mm), and a deviation A1 of 10 mm (A1=10 mm), and a negative electrode having a negative-electrode active material mixture layer width B2 of 84 mm (B2=84 mm), and a deviation A2 of 2 mm (A2=2 mm). (Designed battery capacity 5.6 Ah)

Example 9

As shown in Table 1, a battery of Example 9 was manufactured in the same way as that of Example 1 except that the battery of Example 9 in use included a positive electrode having a positive-electrode active material mixture layer width B1 of 80 mm (B1=80 mm), and a deviation A1 of 14 mm (A1=14 mm), and a negative electrode having a negative-electrode active material mixture layer width B2 of 84 mm (B2=84 mm), and a deviation A2 of 2 mm (A2=2 mm). (Designed battery capacity 5.6 Ah)

Example 10

As shown in Table 1, a battery of Example 10 was manufactured in the same way as that of Example 1 except that the battery of Example 10 in use included a positive electrode having a positive-electrode active material mixture layer width B1 of 80 mm (B1=80 mm), and a deviation A1 of 2 mm (A1=2 mm), and a negative electrode having a negative-electrode active material mixture layer width B2 of 84 mm (B2=84 mm), and a deviation A2 of 4 mm (A2=4 mm). (Designed battery capacity 5.6 Ah)

Example 11

As shown in Table 1, a battery of Example 11 was manufactured in the same way as that of Example 1 except that the battery of Example 11 in use included a positive electrode having a positive-electrode active material mixture layer width B1 of 80 mm (B1=80 mm), and a deviation A1 of 6 mm (A1=6 mm), and a negative electrode having a negative-electrode active material mixture layer width B2 of 84 mm (B2=84 mm), and a deviation A2 of 4 mm (A2=4 mm). (Designed battery capacity 5.6 Ah)

Example 12

As shown in Table 1, a battery of Example 12 was manufactured in the same way as that of Example 1 except that the battery of Example 12 in use included a positive electrode having a positive-electrode active material mixture layer width B1 of 80 mm (B1=80 mm), and a deviation A1 of 10 mm (A1=10 mm), and a negative electrode having a negative-electrode active material mixture layer width B2 of 84 mm (B2=84 mm), and a deviation A2 of 4 mm (A2=4 mm). (Designed battery capacity: 5.6 Ah)

Example 13

As shown in Table 1, a battery of Example 13 was manufactured in the same way as that of Example 1 except that the battery of Example 13 in use included a positive electrode having a positive-electrode active material mixture layer width B1 of 84 mm (B1=84 mm), and a deviation A1 of 2 mm (A1=2 mm), and a negative electrode having a negative-electrode active material mixture layer width B2 of 88 mm (B2=88 mm), and a deviation A2 of 2 mm (A2=2 mm). (Designed battery capacity 5.9 Ah)

Example 14

As shown in Table 1, a battery of Example 14 was manufactured in the same way as that of Example 1 except that the battery of Example 14 in use included a positive electrode having a positive-electrode active material mixture layer width B1 of 84 mm (B1=84 mm), and a deviation A1 of 6 mm (A1=6 mm), and a negative electrode having a negative-electrode active material mixture layer width B2 of 88 mm (B2=88 mm), and a deviation A2 of 2 mm (A2=2 mm). (Designed battery capacity 5.9 Ah)

Example 15

As shown in Table 1, a battery of Example 15 was manufactured in the same way as that of Example 1 except that the battery of Example 15 in use included a positive electrode having a positive-electrode active material mixture layer width B1 of 84 mm (B1=84 mm), and a deviation A1 of 10 mm (A1=10 mm), and a negative electrode having a negative-electrode active material mixture layer width B2 of 88 mm (B2=88 mm), and a deviation A2 of 2 mm (A2=2 mm). (Designed battery capacity 5.9 Ah)

Example 16

As shown in Table 1, a battery of Example 16 was manufactured in the same way as that of Example 1 except that the battery of Example 16 in use included a positive electrode having a positive-electrode active material mixture layer width B1 of 84 mm (B1=84 mm), and a deviation A1 of 14 mm (A1=14 mm), and a negative electrode having a negative-electrode active material mixture layer width B2 of 88 mm (B2=88 mm), and a deviation A2 of 2 mm (A2=2 mm). (Designed battery capacity 5.9 Ah)

Comparative Example 1

As shown in Table 1, a battery of Comparative Example 1 was manufactured in the same way as that of Example 1 except that the battery of Comparative Example 1 in use included a positive electrode having a positive-electrode active material mixture layer width B1 of 80 mm (B1=80 mm), and a deviation A1 of 22 mm (A1=22 mm), and a negative electrode having a negative-electrode active material mixture layer width B2 of 85 mm (B2=85 mm), and a deviation A2 of 2 mm (A2=2 mm). (Designed battery capacity: 5.6 Ah)

Comparative Example 2

As shown in Table 1, a battery of Comparative Example 2 was manufactured in the same way as that of Example 1 except that the battery of Comparative Example 2 in use included a positive electrode having a positive-electrode active material mixture layer width B1 of 80 mm (B1=80 mm), and a deviation A1 of 26 mm (A1=26 mm), and a negative electrode having a negative-electrode active material mixture layer width B2 of 85 mm (B2=85 mm), and a deviation A2 of 2 mm (A2=2 mm). (Designed battery capacity: 5.6 Ah)

Comparative Example 3

As shown in Table 1, a battery of Comparative Example 3 was manufactured in the same way as that of Example 1 except that the battery of Comparative Example 3 in use included a positive electrode having a positive-electrode active material mixture layer width B1 of 80 mm (B1=80 mm), and a deviation A1 of 18 mm (A1=18 mm), and a negative electrode having a negative-electrode active material mixture layer width B2 of 84 mm (B2=84 mm), and a deviation A2 of 2 mm (A2=2 mm). (Designed battery capacity: 5.6 Ah)

Comparative Example 4

As shown in Table 1, a battery of Comparative Example 4 was manufactured in the same way as that of Example 1 except that the battery of Comparative Example 4 in use included a positive electrode having a positive-electrode active material mixture layer width B1 of 80 mm (B1=80 mm), and a deviation A1 of 22 mm (A1=22 mm), and a negative electrode having a negative-electrode active material mixture layer width B2 of 84 mm (B2=84 mm), and a deviation A2 of 2 mm (A2=2 mm). (Designed battery capacity: 5.6 Ah)

Comparative Example 5

As shown in Table 1, a battery of Comparative Example 5 was manufactured in the same way as that of Example 1 except that the battery of Comparative Example 5 in use included a positive electrode having a positive-electrode active material mixture layer width B1 of 80 mm (B1=80 mm), and a deviation A1 of 14 mm (A1=14 mm), and a negative electrode having a negative-electrode active material mixture layer width B2 of 84 mm (B2=84 mm), and a deviation A2 of 4 mm (A2=4 mm). (Designed battery capacity: 5.6 Ah)

Comparative Example 6

As shown in Table 1, a battery of Comparative Example 6 was manufactured in the same way as that of Example 1 except that the battery of Comparative Example 6 in use included a positive electrode having a positive-electrode active material mixture layer width B1 of 80 mm (B1=80 mm), and a deviation A1 of 18 mm (A1=18 mm), and a negative electrode having a negative-electrode active material mixture layer width B2 of 84 mm (B2=84 mm), and a deviation A2 of 4 mm (A2=4 mm). (Designed battery capacity: 5.6 Ah)

Comparative Example 7

As shown in Table 1, a battery of Comparative Example 7 was manufactured in the same way as that of Example 1 except that the battery of Comparative Example 7 in use included a positive electrode having a positive-electrode active material mixture layer width B1 of 84 mm (B1=84 mm), and a deviation A1 of 18 mm (A1=18 mm), and a negative electrode having a negative-electrode active material mixture layer width B2 of 88 mm (B2=88 mm), and a deviation A2 of 2 mm (A2=2 mm). (Designed battery capacity: 5.9 Ah)

Comparative Example 8

As shown in Table 1, a battery of Comparative Example 8 was manufactured in the same way as that of Example 1 except that the battery of Comparative Example 8 in use included a positive electrode having a positive-electrode active material mixture layer width B1 of 84 mm (B1=84 mm), and a deviation A1 of 22 mm (A1=22 mm), and a negative electrode having a negative-electrode active material mixture layer width B2 of 88 mm (B2=88 mm), and a deviation A2 of 2 mm (A2=2 mm). (Designed battery capacity: 5.9 Ah)

(Evaluation)

First, 10 batteries per example or comparison example having each specification described above were manufactured, and then evaluated as follows. (A) A charge and discharge cycle test of each battery were performed for 100 cycles on a constant current charging condition in which the battery was charged up to a charging end voltage of 4.1 V and on a constant current discharging condition in which the battery was discharged up to a discharging end voltage of 2.7 V, using large current of 60 A (at about 0.1 hour rate). The battery after 100 cycles was charged up to 3.6 V, and then a decrease in voltage of the battery was measured for 30 days. The battery whose voltage was equal to or more than 3.55 V after 30 days was determined not to have a small internal short circuit. The battery whose voltage was below 3.55 V after 30 days was determined to have the small internal short circuit. (B) On the other hand, the battery after measuring the decrease in voltage was disassembled, and the presence or absence of a position where the positive-electrode active material layer and the negative-electrode active material layer were not opposed to each other was examined. Further, a value of $(A1+A2)/(B2-B1)=K$ (hereinafter referred to as a "K value") of each battery of Examples and Comparative Examples was determined. The results of the tests and examination and the K values are shown in the following table 2.

| Item | Number of batteries determined to have small internal short circuit | Number of batteries having parts not opposed | K value |
|---|---|---|---|
| Example 1 | 0 | 0 | 0.8 |
| Example 2 | 0 | 0 | 1.6 |
| Example 3 | 0 | 0 | 2.4 |
| Example 4 | 0 | 0 | 3.2 |
| Example 5 | 0 | 0 | 4.0 |
| Example 6 | 0 | 0 | 1.0 |

-continued

| Item | Number of batteries determined to have small internal short circuit | Number of batteries having parts not opposed | K value |
|---|---|---|---|
| Example 7 | 0 | 0 | 2.0 |
| Example 8 | 0 | 0 | 3.0 |
| Example 9 | 0 | 0 | 4.0 |
| Example 10 | 0 | 0 | 1.5 |
| Example 11 | 0 | 0 | 2.5 |
| Example 12 | 0 | 0 | 3.5 |
| Example 13 | 0 | 0 | 1.0 |
| Example 14 | 0 | 0 | 2.0 |
| Example 15 | 0 | 0 | 3.0 |
| Example 16 | 0 | 0 | 4.0 |
| Comparative Example 1 | 10 | 10 | 4.8 |
| Comparative Example 2 | 10 | 10 | 5.6 |
| Comparative Example 3 | 10 | 10 | 5.0 |
| Comparative Example 4 | 10 | 10 | 6.0 |
| Comparative Example 5 | 10 | 10 | 4.5 |
| Comparative Example 6 | 10 | 10 | 5.5 |
| Comparative Example 7 | 10 | 10 | 5.0 |
| Comparative Example 8 | 10 | 10 | 6.0 |

As shown in Table 2, the battery having a K value of 4 or less did not have any small short circuit in the battery, and did not have any positions where the positive-electrode mixture layer and the negative-electrode mixture layer were not opposed to each other. In short, the battery having the K value of 4 or less enables the large current charge and discharge and has excellent standing characteristics after the charging without any small internal short circuit. The negative-electrode active material mixture layer width $B2$ is set larger than the positive-electrode active material mixture layer width $B1$, so that lithium dendrite can be prevented from locally occurring at the surface of the negative electrode even when the amount of supply of the lithium is unevenly distributed. From the above-mentioned fact, the batteries of Examples are determined to have excellent charge and discharge characteristics and safety.

The invention provides a lithium secondary battery that enables large current charge and discharge with both excellent charge and discharge characteristics and safety. Therefore, the invention has industrial applicability in that it contributes to the production and sale of lithium secondary batteries.

What is claimed is:

1. A lithium secondary battery comprising an electrode assembly accommodated in a battery case, said electrode assembly including a positive electrode and a negative electrode which are assembled together with a separator interposing between said both electrodes, each of said electrodes including an active material mixture layer portion and an active material mixture layer-free portion which are arranged on a surface of a metal foil in a width direction of said metal foil corresponding to an axial direction of said electrode assembly and extended in a length direction of said metal foil lying at right angles to said width direction, wherein said active material mixture layer free-portion is arranged at one end side of said metal foil in said width direction to be a part of collector, wherein said active material mixture layer-free portion has an edge with distortion throughout its length and thereby has a deviation between a straight line linking two corners on both extreme ends of said active material mixture layer-free portion in said length direction of said metal foil and said edge with distortion of said active material mixture layer-free portion at a middle point of said straight line in said length direction of said metal foil,
wherein a relationship of $B1<B2$ is satisfied, and a value of $(A1+A2)/(B2-B1)$ is set equal to or less than 4, where:
$B1$ (mm) is a width of said active material mixture layer portion of said positive electrode;
$B2$ (mm) is a width of said active material mixture layer portion of said negative electrode;
each of $A1$ (mm) in said positive electrode and $A2$ (mm) in said negative electrode is said deviation between said straight line and said edge with distortion of said active material mixture layer-free portion at the middle point of said straight line in said length direction of said metal foil of each electrode, and each of $A1$ (mm) and $A2$ (mm) is greater than zero.

2. The lithium secondary battery according to claim 1, wherein said active material mixture layer portion of said positive electrode contains lithium transition metal double oxide, and said active material mixture layer portion of said negative electrode contains carbon material, and wherein said value of $(A1+A2)/(B2-B1)=k$ is set at $0.8 \leq k \leq 4.0$.

3. The lithium secondary battery according to claim 1, wherein each of said electrodes has been extended in its length direction by being subjected to the predetermined load before being assembled.

4. The lithium secondary battery according to claim 1, wherein said battery has a capacity of 3 Ah or more, and a maximum discharge current value of 60 A or more.

5. The lithium secondary battery according to claim 1, wherein each of $A1$ and $A2$ is equal to or more than 2 mm.

* * * * *